Dec. 9, 1969  W. R. BRAY  3,482,625
TWO PHASE HEAT EXCHANGER
Filed April 3, 1968  3 Sheets-Sheet 1
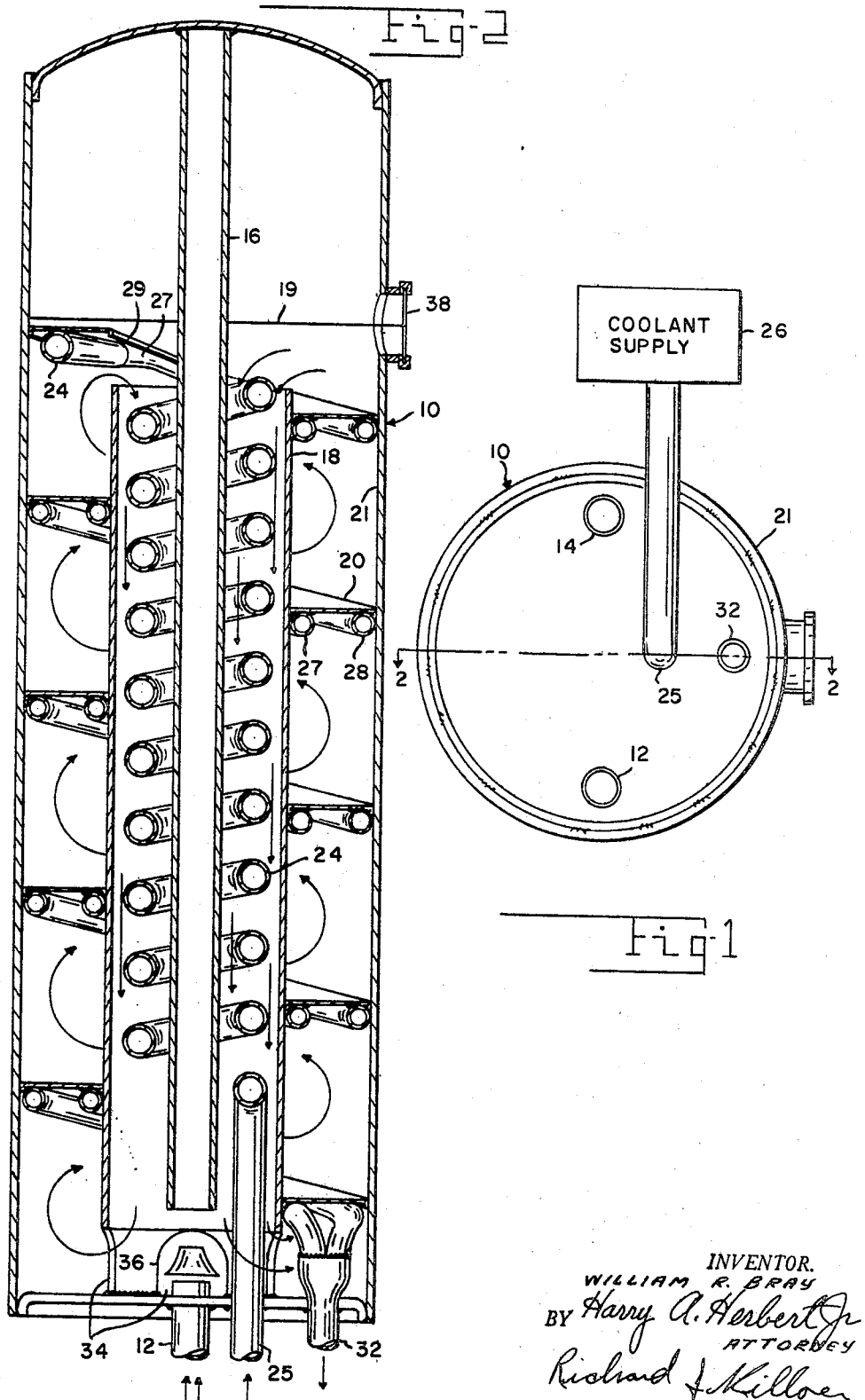
INVENTOR.
WILLIAM R. BRAY
BY Harry A. Herbert Jr.
ATTORNEY
Richard J. Killoren
AGENT Dec. 9, 1969 W. R. BRAY 3,482,625
TWO PHASE HEAT EXCHANGER Filed April 3, 1968 3 Sheets-Sheet 2

INVENTOR.
WILLIAM R. BRAY
BY Harry A. Herbert Jr.
ATTORNEY
Richard J. Killoren
AGENT United States Patent Office 3,482,625
Patented Dec. 9, 1969

3,482,625
TWO PHASE HEAT EXCHANGER
William R. Bray, 610 Memorial Drive,
Fort Walton Beach, Fla. 32548
Filed Apr. 3, 1968, Ser. No. 718,497
Int. Cl. F28d 15/00, 7/10; F28b 1/00
U.S. Cl. 165—106                5 Claims

ABSTRACT OF THE DISCLOSURE

A heat exchanger that has a chamber filled with a volatile liquid has hot vapor of the same chemical composition admitted near the bottom of the chamber. The vapor is condensed as it ascends with the liquid and gives up its heat to the liquid. The liquid is then cooled either by air or another liquid.

Background of the invention

Various means have been used to condense the vapors of volatile liquids such as blowing the hot vapors over cooling coils or by blowing the hot vapors through cooling liquid sprays. However, in these systems, all of the vapor does not come into intimate contact with the liquid, and the heat exchange process is very inefficient.

Summary of the invention

According to this invention, the hot vapor is admitted to the bottom of a condenser chamber containing a liquid of the same chemical composition as the vapor. The vapor bubbles up through the liquid, and the liquid and vapor follow a spiral path toward the top of the condenser chamber. As the vapor bubbles rise they become smaller and smaller until they disappear. The liquid which has been heated by the condensing vapor is then cooled by means of a second liquid that is passed through helical tubes within the liquid. In another embodiment, the liquid in the condenser is cooled by passing it through a radiator heat exchanger which has air blown over it by means of a fan.

Brief description of the drawing

FIG. 1 is the bottom view of a two phase heat exchanger according to one embodiment of the invention;

FIG. 2 is a sectional view of the device of FIG. 1 along the line 2—2;

Description of the preferred embodimnt

Figure 3:
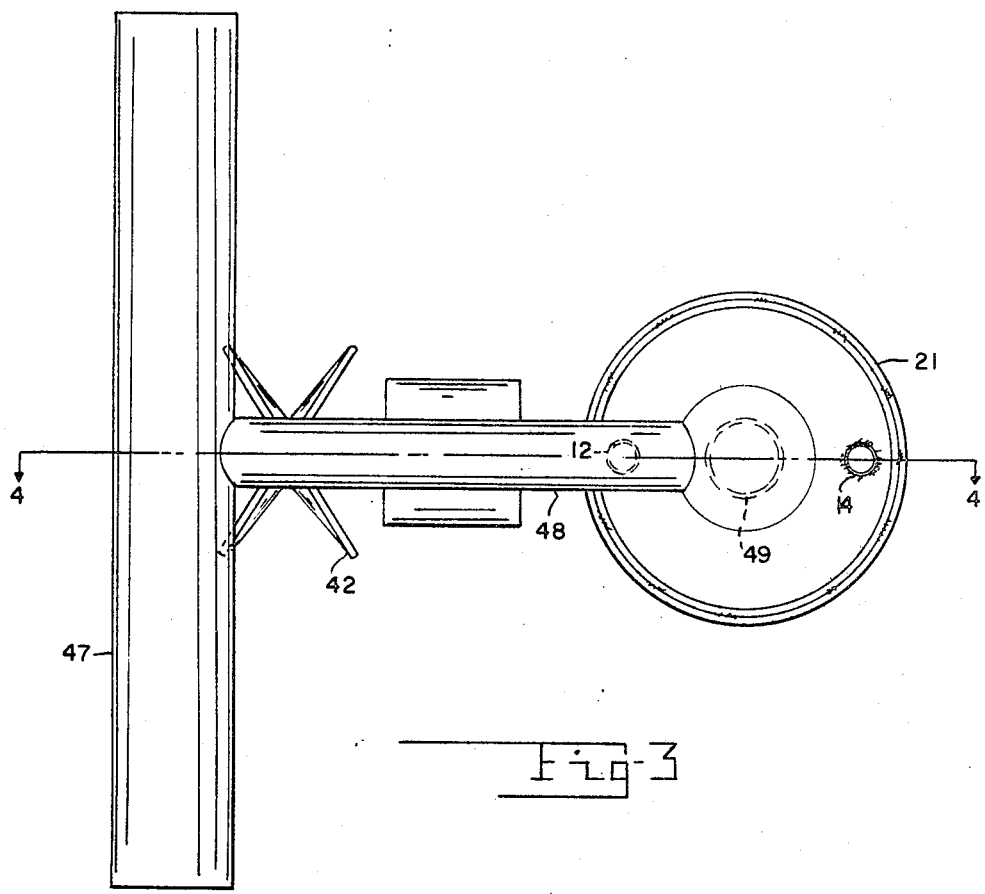
FIG. 3 is the bottom view of a two phase heat exchanger according to another embodiment of the invention.

Reference is now made to FIG. 1 and FIG. 2 of the drawing which show a condenser chamber 10 having an input 12 for hot vapors such as Freon, or other refrigerant, and an output tube 14 for the cool liquid, as shown in FIG. 1. A tubular inner wall member 16 is provided within chamber 10. A divider tube 18 separates the upward flow of the hot vapor and liquid 19 from the downward flow of the cool liquid. A helical baffle 20 is provided between the outer wall 21 of chamber 10 and the divider tube 18. A helical cooling tube 24 is provided between the wall member 16 and the divider tube 18 and is connected to input tube 25. The cooling tube 24 connects to a pair of helical cooling tubes 27 and 28 at 29. The tubes 27 and 28 are positioned adjacent to the lower surface of helical baffle 20. Tubes 27 and 28 connect to output tube 32. A coolant such as water from supply 26 is supplied to the input tube 25 and is taken out at 32. Though not shown, the coolant may be reconditioned and returned to supply 26 is desired. Openings 34 are provided in the bottom of the divider tube 18 to permit the flow of cool liquid to the output tube 14, shown in FIG. 1, and also to provide cool liquid to mix with the incoming vapor from input 12. A substantially conical shaped nozzle 36 is provided to aid in the circulation process. A sight glass 38 may be provided in the side of the chamber 10 so that the liquid level can be observed and maintained at the desired level.

In the operation of the device of the invention, a coolant such as water is supplied to the input tube 25 and passes up through tube 24 so as to cool the liquid within the tube 18. The cooled liquid moves downward within tube 18 and passes out through openings 34. The cool liquid either passes out through output tube 14 or mixes with the hot vapor from input tube 12. As the hot vapor rises it carries the liquid with it up the spiral path between wall 21 and divider 18. As the vapor bubbles rise along the spiral path, they get smaller and smaller as the vapor condenses until the bubbles disappear. When the liquid reaches the top of tube 18, some of the liquid flows over the top edge of tube 18 and is cooled within tube 18 as described above. There is some cooling of the liquid Freon by tubes 27 and 28. As can be seen however, the coolant, in the tube 24, which comes in contact with liquid 19 will have the lowest temperature near the bottom of divider 18 near the input 25.

Figure 4:
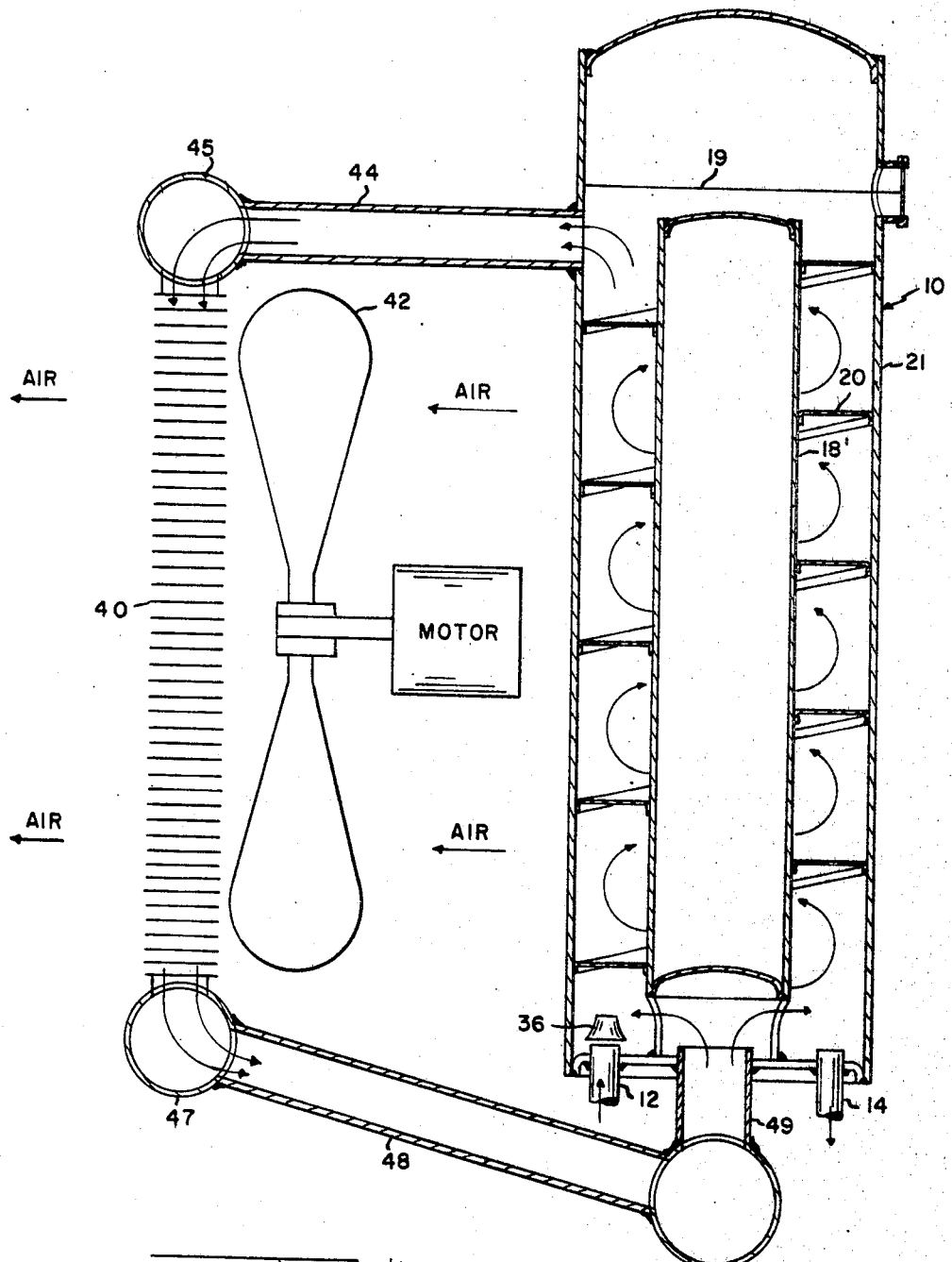
FIG. 4 is a partial sectional view of the device of FIG. 3 along the line 4—4.

Though liquid cooling for the liquid 19 has been described with respect to FIGS. 1 and 2, other cooling means could be provided such as air as shown in FIGS. 3 and 4. In this device, the condenser is substantially the same as in FIGS. 1 and 2 except that the inner wall 16 and tubes 24, 25, 27, 28 and 32 are omitted and the divider tube 18' is sealed at the top and bottom and provides an inner wall member. In this device, the liquid 19 is air-cooled in a radiator element 40 by means of a fan 42. The liquid 19 is supplied to the radiator 40 by means of conduit members 44 and 45 and is returned to the condenser 10 through conduit members 47, 48 and 49.

The operation of the device of FIGS. 3 and 4 is essentially the same as the device of FIGS. 1 and 2 except that the liquid 19 is cooled by means of air as it travels through the radiator 40. The cooled liquid is then returned to the condenser through conduits 47, 48 and 49 where a portion goes to output 14 and another portion mixes with the incoming hot vapors as in the device of FIGS. 1 and 2.

Though a helical path has been shown for the rising vapors and liquid in chamber 10, other means for lengthening the flow path in the liquid could be provided such as by the use of staggered interleaved baffle plates extending from opposite walls.

There is thus provided a device wherein hot gases are condensed by passing them through a liquid of the same chemical composition with the liquid in turn being cooled either by another liquid or with air.

While certain specific embodiments have been described, it is obvious that numerous changes may be made without departing from the general principles and scope of the invention.

What is claimed is:

1. A two phase heat exchanger system, comprising: a first tubular member; said tubular member being closed at both ends to form an enclosed chamber; means for admitting hot vapor near the bottom of said chamber; said chamber being filled to a predetermined level with a liquid having the same chemical composition as said vapor; means, within said chamber for providing a greater length of flow path toward the top of the chamber for the liquid and vapor, than the linear distance between the bottom of the chamber and the surface of the liquid within the chamber, wherein the vapor condenses and gives up its heat to the liquid; means for providing a return flow path for the liquid from the top to the bottom of said contrainer; means for cooling the liquid in the return flow path and means for removing a portion of the cooled liquid from the chamber.

2. The device as recited in claim 1 including a second tubular member within and spaced from said first tubular member; a helical baffle within said chamber between the first tubular member and the second tubular member; said vapor being admitted near the bottom of the chamber to the space between the first and second tubular members whereby the vapor and liquid ascend toward the top of the chamber along a substantially helical path.

3. A two phase heat exchanger as recited in claim 1 wherein said means for cooling the liquid comprises, a radiator element; means for passing the liquid within said chamber through said radiator element and for returning the cooled liquid to the bottom of the chamber and means for air cooling the liquid in said radiator element.

4. A two phase heat exchanger as recited in claim 2 including coil means, within said chamber, for cooling the liquid within the chamber and means for supplying a coolant to said cooling coil means.

5. A two phase heat exchanger as recited in claim 4 wherein said second tubular member has openings in the top and bottom for the passage of liquid; said cooling coil means including a first coil, within said second tubular member, for cooling the liquid inside of said second tubular member; a second cooling coil, outside of the second tubular member wound adjacent said helical baffle, for providing cooling for the liquid outside said second tubular member; said coil within said second tubular member being interconnected with the coil outside of the second tubular member; said coolant being supplied to the coil within the second tubular member and being removed from the coil outside of the second tubular member to provide a downward flow of liquid within the first tubular member; said second tubular member having a length less than the distance between the bottom of the chamber and the surface of the liquid whereby the heated liquid may flow over the top and into the second tubular member.

References Cited

UNITED STATES PATENTS

| 2,071,624 | 2/1937 | Graham | 165—108 |
| 2,289,953 | 7/1942 | Aldridge | 165—109 X |
| 2,937,079 | 5/1960 | Van Pool | 165—108 X |

FOREIGN PATENTS 1,155,755  12/1957  France.

ROBERT A. O'LEARY, Primary Examiner

ALBERT W. DAVIS, Assistant Examiner

U.S. Cl. X.R.

165—110, 160, 163